United States Patent
Tokiwa et al.

(12)

(10) Patent No.: US 6,686,400 B2
(45) Date of Patent: Feb. 3, 2004

(54) FOAMED AND EXPANDED BEADS OF POLYESTER-BASED RESIN AND FOAM MOLDING OBTAINED THEREFROM

(75) Inventors: Tomoo Tokiwa, Utunomiya (JP); Mitsuru Shinohara, Kanuma (JP); Hidehiro Sasaki, Tochigi-ken (JP)

(73) Assignee: JSP Corporation (JP)

( * ) Notice: Subject to any disclaimer, the term of this patent is extended or adjusted under 35 U.S.C. 154(b) by 0 days.

(21) Appl. No.: 10/190,549

(22) Filed: Jul. 9, 2002

(65) Prior Publication Data

US 2003/0119928 A1 Jun. 26, 2003

(30) Foreign Application Priority Data

Jul. 10, 2001 (JP) ........................................ 2001-209694
Apr. 4, 2002 (JP) ........................................ 2002-102573

(51) Int. Cl.[7] .............................. C08J 9/22; C08J 9/224
(52) U.S. Cl. ............................. 521/56; 521/60; 521/97; 521/182
(58) Field of Search ............................ 521/56, 60, 182, 521/97

(56) References Cited

U.S. PATENT DOCUMENTS

| 4,214,054 | A | 7/1980 | Watanabe et al. .............. 521/95 |
| 5,310,872 | A | 5/1994 | Takahashi et al. ........... 525/440 |
| 5,314,927 | A | 5/1994 | Kondo et al. ................ 521/159 |
| 5,314,969 | A | 5/1994 | Imaizumi et al. ........... 525/440 |
| 5,321,062 | A | 6/1994 | Landrum et al. ............ 523/414 |
| 5,324,656 | A | 6/1994 | Ham et al. ................ 435/240.2 |
| 5,324,794 | A | 6/1994 | Taka et al. .................... 525/440 |
| 5,391,644 | A | 2/1995 | Yasuda et al. ............... 525/440 |
| 5,525,409 | A | 6/1996 | Takahashi et al. ........... 428/224 |
| 5,530,058 | A | 6/1996 | Imaizumi et al. ........... 524/602 |
| 6,110,983 | A | 8/2000 | Tokoro et al. ................. 521/56 |

FOREIGN PATENT DOCUMENTS

EP 0 989 159 A1 5/1998

*Primary Examiner*—Morton Foelak
(74) *Attorney, Agent, or Firm*—Lorusso, Loud & Kelly

(57) ABSTRACT

Foamed and expanded beads including a polyester-based resin containing at least 35 mole % of an aliphatic ester component. The foamed beads have a gel fraction of at least 5 % by weight and comprises at least one gel accelerating agent selected from fatty acids having 12–25 carbon atoms, metal salts of the fatty acids, esters of the fatty acids and amides of the fatty acids in an amount of 0.15–3 % by weight. A foam molding is obtained by heating the foamed and expanded beads in a mold.

13 Claims, No Drawings

FOAMED AND EXPANDED BEADS OF POLYESTER-BASED RESIN AND FOAM MOLDING OBTAINED THEREFROM

BACKGROUND OF THE INVENTION

This invention relates to foamed and expanded beads of a polyester-based resin and to a foam molding obtained therefrom.

Foamed plastic moldings are recently used in large amounts mainly as packing receptacles and cushioning materials, because of their lightness in weight, cushioning property, heat insulating property and moldability. These foamed plastic moldings, however, pose a problem of pollution of natural environment by disposal thereof. To cope with this problem, a variety of biodegradable foam moldings have been proposed. For example, Japanese Laid Open Patent Publication No. H06-248106 proposes a method for obtaining a foam molding in which biodegradable aliphatic polyester beads are impregnated with propane and pentane as a blowing agent. The beads are heated with steam to form foamed and expanded beads, which are subsequently molded by heating in a mold cavity. Japanese Laid Open Patent Publication No. H10-324766 discloses a foam molding of an aliphatic polyester having a gel fraction of at least 5% by weight.

The known foamed polyester resin moldings, however, are not fully satisfactory. The foam molding obtained with the method of Japanese publication H06-248106 undergoes considerable shrinkage during the molding step and has poor dimensional stability. While Japanese publication H10-324766 has solved the problem of shrinkage, the foam molding thereof has a problem in resistance to hydrolysis.

SUMMARY OF THE INVENTION

It is an object of the present invention to provide foamed, expanded beads of a polyester-based resin which have excellent resistance to hydrolysis and which can afford foam moldings having excellent heat resistance and excellent resistance to hydrolysis.

Another object of the present invention is to provide foamed, expanded beads of the above-mentioned type which has a low apparent density.

In accomplishing the above objects, the present invention provides foamed and expanded beads comprising:
  a base resin including a polyester-based resin containing at least 35 mole % of an aliphatic ester component, and
  at least one gel accelerating agent selected from the group consisting of fatty acids having 12–25 carbon atoms, metal salts of the fatty acids, esters of the fatty acids and amides of the fatty acids in an amount of 0.15–3% by weight, said beads having a gel fraction of at least 5% by weight.

In another aspect, the present invention provides a foam molding obtained by heating the above foamed and expanded beads.

The foamed and expanded beads according to the present invention have excellent heat resistance, hydrolysis resistance and moldability as well as biodegradability and exhibit a sufficient expandability while maintaining cell wall strengths, so that there can be produced, with good reproducibility, low-density foam moldings having excellent properties such as good shape recovery by aging, good surface smoothness, strong adhesion between cells and high dimensional accuracy. The foamed and expanded beads according to the present invention permit the production of foam moldings at a lower temperature as compared with those beads which do not contain the gel accelerating agent but contain inorganic particles.

The foamed bead molding obtained using the foamed beads of the present invention is excellent in heat resistance, hydrolysis resistance (especially in hydrolysis resistance under a high temperature and humidity conditions), dimensional stability and appearance. The foam molding also has a high closed cell content and is thus excellent in mechanical strengths such as compressive creep resistance, and cushioning property. Because of these properties, the foam molding is preferably applied to a cushioning material, wrapping material and containers of various types. Also, the foamed bead molding, which has biodegradability and is thus easy to dispose of after use, has great industrial significance.

Other objects, features and advantages of the present invention will become apparent from the detailed description of the preferred embodiments of the invention to follow.

DETAILED DESCRIPTION OF THE PREFERRED EMBODIMENTS OF THE INVENTION

The foamed and expanded beads including a base resin which comprises a polyester-based resin (hereinafter referred to simply as "expanded beads") according to the present invention may be prepared by expanding unexpanded beads of the above base resin.

The polyester-based resin which is the essential component of the base resin may be any polyester-based resin containing an aliphatic ester component in the main chain thereof in an amount of at least 35 mole %, preferably 45–100 mole %, more preferably 60–100 mole %. Such a polyester-based resin has biodegradability.

Examples of the polyester-based resin include (a) aliphatic polyesters, such as polybutylene succinate, polybutylene adipate and poly(butylene succinate/adipate), obtained by polycondensation of an aliphatic polyol and an aliphatic polycarboxylic acid, (b) aliphatic-aromatic polyesters, such as poly(butylenesuccinate/terephthalate), obtained by polycondensation of an aromatic polycarboxylic acid, an aliphatic polycarboxylic acid and an aliphatic polyol, as disclosed in published Japanese translation of international patent application (JP-T-H10-505620), (c) ring open polymerization products of lactones such as polycaprolactone, and (d) polycondensation products of hydroxyacids such as hydroxybutyric acid and lactic acid.

Additionally, the polyester-based resin may be a product obtained by treating the above polyester with a coupling agent for increasing the molecular weight thereof, a blend of a plurality of the above polyesters or a copolymer of the above polyester with a carbonic diester.

Examples of the coupling agents include diisocyanates such as 2,4-tolylenediisocyanate, diphenylmethane-diisocyanate, 1,5-naphthylenediisocyanate, xylylenediisocyanate, hydrogenated xylylenediisocyanate, hexamethylenediisocyanate and isophoronediisocyanate; and aryl carbonates such as dimethyl carbonate, diethyl carbonate, diphenyl carbonate, ditolyl carbonate, bis(chlorophenyl) carbonate and m-cresyl carbonate.

Particularly preferred polyester-based resins for use in the present invention are products obtained by polycondensing one or more aliphatic polyols having not more than 4 carbon atoms with one or more aliphatic dicarboxylic acids having not more than 4 carbon atoms.

The base resin may contain one or more additional polymers other than the polyester-based resin, if desired. Examples of such additional polymers include a styrene-butadiene copolymer, a styrene-butadiene-styrene block copolymer, a styrene-isoprene-styrene block copolymer, a hydrogenated styrene-butadiene-styrene block copolymer, a hydrogenated styrene-isoprene-styrene block copolymer, an ethylene-propylene rubber, polyethylene, polypropylene, polystyrene, polyethylene terephthalate, polybutylene terephthalate, polycarbonate, polyamide, starch and cellulose. The amount of the additional polymer or polymers is not more than 40% by weight, preferably not more than 20% by weight, most preferably not more than 10% by weight, based on the weight of the base resin.

In the production of foamed and expanded beads (hereinafter referred to simply as "expanded beads") according to the present invention, unexpanded beads of the above base resin are first prepared. The unexpanded beads may be produced by any conventional method. For example, the base resin containing a polyester-based resin is melted and kneaded with an extruder and then extruded into strands. The strands are cooled and then cut into a desired length or are first cut into a suitable length and then cooled to obtain unexpanded beads. The average weight of one polyester-based resin-containing bead may be 1–6 mg, preferably 1–4 mg. When the average weight of the beads is excessively large, a difficulty may be caused in controlling the expansion of the expanded beads at the time of molding in a mold cavity by control of the temperature of a heating medium. Further, too large a weight of the beads may require a long cooling time after the molding step and may adversely affect the surface smoothness of the molding. Furthermore, when the density of the expanded beads is desired to be low, such large weight beads must be expanded to have a large size, causing a difficulty in filling the expanded beads in a mold cavity. On the other hand, it is difficult to produce resin beads having an average weight below the above lower limit in a stable manner.

As used herein, the "average weight of one bead" is determined by first measuring the total weight of a group of beads (including at least 1000 beads) which have been allowed to stand at 30–40 Torr in an oven at 80° C. for 8 hours, and then counting the total number of the beads of the group. The average is then calculated by dividing the total weight by the total number.

In extrusion of the base resin with an extruder into strands, it is preferred that the base resin be previously dried, so that the moisture content of the base resin to be charged into the extruder is no more than 1000 ppm by weight. When the moisture content is excessively high, it is necessary to remove the moisture from vacuum vents during the extrusion step, since otherwise bubbles will be apt to be included in the resin and will adversely affect the uniformity in the cell size of the expanded beads obtained from the extruded beads. In addition, the presence of moisture in a mass of the kneaded molten resin contained in the extruder is apt to considerably increase the melt flow rate (MFR) of the resin. In this relation, it is desirable that not only the moisture content but also other extrusion conditions should be controlled so that a significant increase of MFR of the resin may be prevented.

It is important that at least one gel accelerating agent selected from fatty acids having 12–25 carbon atoms, metal salts of the fatty acids, esters of the fatty acids and amides of the fatty acids be incorporated into the unexpanded beads in an amount of 0.15–3% by weight based on the weight of the expanded beads in order to efficiently impart a desired gel fraction to the unexpanded beads during the hereinafter described gelling step, to attain improved heat resistance, resistance to hydrolysis and moldability of the expanded beads and, thereby to achieve improved heat resistance, resistance to hydrolysis and dimensional stability of the moldings obtained by heating the expanded beads in a mold. Although not wishing to be bound by the theory, the gel accelerating agent is considered to favor the reversible reactions of formation and decomposition of gels to shift toward the gel formation side.

At least 0.15% by weight of the gel accelerating agent is necessary to obtain a substantial improvement of the resistance to hydrolysis. When the amount of the gel accelerating agent exceeds 3% by weight, however, the thickness of the walls of bubbles of the expanded beads is so thin that the foam molding obtained from the expanded beads has a low closed cell content due to breakage of the cell walls thereof. The amount of the gel accelerating agent is preferably 0.2–2% by weight, more preferably 0.3–1% by weight. The gel accelerating agent is preferably uniformly dispersed in the base resin.

Examples of the fatty acid having 12–25 carbon atoms include saturated fatty acids such as lauric acid, palmitic acid, stearic acid and behenic acid, unsaturated fatty acids such as oleic acid, erucic acid, linoleic acid and linolenic acid, and dicarboxylic fatty acids such as dimer acid.

The metal of the metal salts of the fatty acids may be, for example, magnesium, calcium, aluminum or zinc. Specific examples of the fatty acid metal salts include calcium stearate, magnesium stearate and aluminum stearate. The use of magnesium stearate is especially preferred.

The alcohol constituting the fatty acid esters is preferably an aliphatic alcohol having 1–25 carbon atoms. Fatty acid esters of an alcohol having 15–20 carbon atoms are preferably used because of a lubricating effect. Thus, such a fatty acid ester permits the use of a low temperature for the formation of beads so that hydrolysis of the polyester-based resin included in the base resin can be prevented and serves to increase the expansion ratio of the expanded beads.

The amine constituting the fatty acid amides is preferably stearamide or palmitamide for reasons of improved gel fraction and safety.

Among the above-described gel accelerating agents, the use of metal salts of fatty acids is particularly preferred for reasons of improved gel forming effect and improved resistance to hydrolysis.

A surfactant, preferably an amine surfactant such as N,N-bis(2-hydroxyethyl)alkylamine, may be suitably used in conjunction with the above gel accelerating agent. The amount of the surfactant is preferably 0.001–5% by weight based on the weight of the unexpanded beads. The weight ratio of the gel accelerating agent to the surfactant is preferably 1:5 to 5:1. The use of the surfactant can further improve the gel fraction of the expanded beads.

It is preferred that inorganic particles be incorporated into the unexpanded beads in an amount of 0.001–5% by weight for reasons of improving the foamability of the unexpanded beads and thereby affording expanded beads having a low apparent density. An amount of the inorganic particles below 0.001% by weight is insufficient to attain the improvement of foambility. When the amount of the inorganic particles is greater than 5% by weight, the thickness of the walls of bubbles of the expanded beads is so thin that the foam molding obtained from the expanded beads has a low closed cell content due to breakage of the cell walls thereof. The amount of the inorganic particles is 0.001–5% by weight, preferably 0.02–1% by weight, more preferably 0.02–0.5% by weight, based on the weight of the expanded beads. The inorganic particles are preferably uniformly dispersed in the base resin together with the above-described gel accelerating agent.

The inorganic particles serving as a nucleating agent for controlling the average diameter of cells and for increasing the expansion ratio of the expanded beads may be, for example, particles of a metal oxide such as silica, diatomaceous earth, alumina, zinc oxide, titanium oxide, calcium oxide, magnesium oxide, iron oxide, tin oxide or antimony oxide; particles of a metal hydroxide such as calcium hydroxide, magnesium hydroxide, aluminum hydroxide or basic magnesium carbonate; particles of a metal carbonate such as calcium carbonate, magnesium carbonate, zinc carbonate or barium carbonate; particles of a metal sulfate such as calcium sulfate or barium sulfate; or particles of a silicate such as calcium silicate, talc, clay, mica, montmorillonite, bentonite, activated clay, sepiolite, imogolite or sericite. The use of a silicate, especially talc, is preferred.

The inorganic particles preferably have an average particle diameter of 1–20 μm, more preferably 1–10 μm, most preferably 1–5 μm. The "average particle diameter" as used herein is a median number equivalent diameter (the particle size wherein 50% by number of the particles in the particle size distribution is smaller in diameter). The average particle diameter may be determined by the light transmission centrifugal sedimentation method.

The unexpanded beads may be colored by inclusion of a coloring agent such as a black, gray, brown, blue or gray pigment or dye. By using colored beads, colored expanded beads and moldings may be obtained. The coloring agent may be organic or inorganic pigment or dye of any conventionally employed type and is preferably used in an amount of 0.001–5 parts by weight per 100 parts by weight of the base resin, though the amount varies with the kind of the color.

In the case of incorporation of the above-described additives including gel accelerating agent and inorganic particles and/or coloring agent, it is possible to directly knead the additives together with the base resin. However, for reasons of improved dispersibility, it is generally preferred that a master batch of the additives be previously prepared and a portion thereof be kneaded with the base resin. The unexpanded beads thus prepared are preferably stored in an environment, such an a moisture-free environment, where the polyester-based resin contained in the base resin is prevented from undergoing hydrolysis.

Before the conversion into expanded beads, the unexpanded beads are subjected to a gel-forming treatment so that hot chloroform insolubles are formed. One suitable gel-forming treatment is to heat a dispersion of the unexpanded beads in a suitable dispersing medium to which a crosslinking agent and, if necessary, a crosslinking aid have been added. Any dispersing medium may be used as long as the base resin of the unexpanded beads is insoluble therein and the additives contained in the unexpanded beads are not reacted therewith. Illustrative of the dispersing media are water, ethylene glycol, methanol, ethanol and mixtures thereof. Water is preferably used.

A melt-adhesion preventing agent may be incorporated into the dispersing medium for preventing melt-adhesion of the unexpanded beads during the heat treatment. Any organic and inorganic solid particles may be used as the melt-adhesion preventing agent, as long as it is insoluble in the dispersing medium and is not fused upon being heated.

Inorganic particles are particularly preferably used. Suitable inorganic melt-adhesion preventing agents include powders or particles of tribasic calcium phosphate, kaolin, talc, mica, aluminum oxide, titanium oxide or aluminum hydroxide. As a dispersing aid, an anionic surfactant such as sodium dodecylbenzenesulfonate or sodium oleate may be suitably used, if necessary. The melt-adhesion preventing agent preferably has an average particle diameter of 0.001–100 μm, more preferably 0.001–30 μm and is added to the dispersing medium in an amount of preferably 0.01–10 parts by weight per 100 parts by weight of the unexpanded beads. The dispersing aid is added to the dispersing medium in an amount of preferably 0.001–5 parts by weight per 100 parts by weight of the unexpanded beads.

As the crosslinking agent, there may be used any conventional organic peroxide preferably having 2–50 carbon atoms, more preferably 4–30 carbon atoms. Examples of the organic peroxide include diacylperoxides such as lauroylperoxide, stearoylperoxide and benzoylperoxide, peroxydicarbonates such as bis(4-t-butylcyclohexyl)-peroxydicarbonate and diisopropylperoxydicarbonate, and peroxyesters such as t-butylperoxyisobutylate.

The use of an organic peroxide having a half-life temperature (1 hour) that is higher than (Tv−25° C.) but lower than (Tv+10° C.), where Tv is the Vicat softening point of the base resin, is particularly preferred. The use of an organic peroxide having excessively high half-life temperature (1 hour) will require so high a heating temperature and so long a heating time for heating the unexpanded beads in water that there is a fear that the polyester-based resin of the base resin be hydrolyzed. It is preferred that benzoylperoxide, particularly water-diluted benzoylperoxide, be used as the organic peroxide, since expanded beads having a large gel fraction of more than about 60% by weight may be easily obtained, since the amount of the organic peroxide may be thus reduced in performing the gel-forming treatment and since the gel-forming treatment can be effectively carried out without need of a specific holding time for the impregnation of the organic peroxide in the unexpanded particles.

Especially preferred combination is the use of water-diluted benzoylperoxide (as the crosslinking agent) with expanded particles containing a fatty acid metal salt having 12–25 carbon atoms (as the gel accelerating agent) and an amine surfactant (e.g. N,N-bis(2-hydroxyethyl)-alkylamine) for reasons of improved gel fraction of the expanded beads or a reduced amount of the crosslinking agent used.

The "Vicat softening point" as used herein is measured in a heating bath by using a silicone oil as a heat conducting medium in accordance with JIS K7206-1999, Method A 50.

The "half-life temperature (N hour(s))" as used herein is a temperature providing a half life of the organic peroxide of N hour(s). The temperature providing a half life of an organic peroxide (N hour(s)) is such that when the organic peroxide is maintained at that temperature for the time period of N hour(s), the amount of theoretical active oxygen is reduced by half. For the measurement of the half-life temperature, the organic peroxide is dissolved in a solvent which is relatively inert to radicals such as benzene or mineral spirit to obtain a 0.1 mol/L solution. The solution is charged in a glass tube whose atmosphere has been replaced with nitrogen. The glass tube is sealed and then placed in a thermostat maintained at a predetermined temperature so that the organic peroxide is thermally decomposed.

It is preferred that the organic peroxide be used in conjunction with a crosslinking aid which may be a compound having at least one, preferably 2–3 unsaturated bonds (inclusive of double bonds and triple bonds) and generally 2–500 carbon atoms, preferably 3–50 carbon atoms. Examples of the crosslinking aid include acrylic acid; acrylates such as methyl acrylate and ethyl acrylate; methacrylates such as methyl methacrylate and ethyl methacrylate; styrene and its homologues; divinyl compounds such as divinylbenzene; acrylate or methacrylate compounds such as ethyleneglycol diacrylate, polyethyleneglycol diacrylate, trimethylolpropane triacrylate, tetramethylolmethane triacrylate, tetramethylolmethane tetraacrylate, ethyleneglycol dimethacrylate, trimethylolpropane trimethacrylate and allyl methacrylate; allyl esters of cyanuric acid or isocyanuric acid such as triallyl cyanurate and triallyl isocyanurate; allyl esters of a carboxylic acid such as triallyl trimellitate, triallyl trimesate, triallyl pyromellitate, triallyl benzophenonetetracarboxylate, diallyl oxalate, diallyl succinate or diallyl adipate; a maleimide compound such as N-phenylmaleimide and N,N'-m-phenylenebismaleimide; polymers having double bonds such as 1,2-polybutadiene; and compounds having at least two triple bonds such as dipropargyl phthalate, dipropargyl isophthalate, tripropargyl trimesate, dipropargyl itaconate or dipropargyl maleate. The use of a combination of an organic peroxide with a divinyl compound, acrylic acid, an acrylate or a methacrylate, especially the use of a combination of benzoylperoxide with divinylbenzene or methyl methacrylate, is particularly preferred.

The organic peroxide as a crosslinking agent is used in an amount of 0.01–10 parts by weight, preferably 0.1–5 parts by weight, per 100 parts by weight of the unexpanded beads. The unsaturated compound as a crosslinking aid is used in an amount of 0.001–10 parts by weight, preferably 0.01–2 parts by weight, per 100 parts by weight of the unexpanded beads.

The gel-forming temperature T (° C.) at which a dispersion of the unexpanded beads in a dispersing medium containing a crosslinking agent is heat-treated, varies depending upon the kind of the base resin and other conditions but is generally a temperature which is not lower than (Tv−60° C.), where Tv is the Vicat softening point of the base resin (T≧Tv−65° C.). For example, in the case of the unexpanded beads made of a polyester (Tv: 109° C.) composed of 1,4-butanediol and succinic acid, the gel-forming temperature is 50–140° C., preferably 90–120° C. The heating time for the gel-forming is preferably less than 3 hours since otherwise there is a possibility that the polyester-based resin might undergo hydrolysis which may result in deterioration of the characteristics of the polyester-based resin and may adversely affect the gel formation.

Before the start of the heat treatment for the gel formation, a step of impregnating the unexpanded beads with an organic peroxide crosslinking agent at a temperature lower than the gel-forming heat treatment temperature may be suitably carried out. The impregnation temperature varies with the kind of the organic peroxide and other conditions but is generally between a temperature providing a half-life temperature (20 hours) and a temperature providing a half-life (5 hours) of the organic peroxide. The time required for the impregnation also varies with the amount of the unexpanded particles and other conditions but is generally 10–120 minutes, preferably 10–60 minutes. While the impregnation more fully proceeds as the impregnation time increases, an excessively long impregnation time is undesirable because there is a possibility that the polyester-based resin might undergo hydrolysis. Thus, the impregnation temperature and time are desired to be selected according to the kind of the base resin. For example, when unexpanded beads made of a polyester (Tv: 109° C.) composed of 1,4-butanediol and succinic acid are to be impregnated with benzoylperoxide, the impregnation temperature is 65–85° C., preferably 70–80° C., and the impregnation time is 10–120 minutes, preferably 10–60 minutes.

When the unexpanded beads are reacted with the crosslinking agent and, if desired, the crosslinking aid for gel formation in a closed vessel, it is desired that the closed vessel be maintained in a low oxygen environment of preferably 5% by volume or less, more preferably 1% by volume or less. Any method such as purging with an inorganic gas such as nitrogen, argon or steam may be adopted. The dispersing medium used for dispersing the unexpanded beads therein is preferably selected so that the content of oxygen dissolved therein is not more than 9.5 mg/L, more preferably not more than 8.5 mg/L.

As a gel-forming method for the unexpanded beads, there may be used any other suitable method, such as electron beam crosslinking method, silane crosslinking method or polyisocyanate crosslinking method than the above method using an organic peroxide as a crosslinking. Such an alternative method may be conducted at any suitable point in time before or after expansion of the unexpanded beads.

The unexpanded beads are expanded by any suitable known method to obtain expanded beads. One preferred expansion method includes dispersing the unexpanded beads in a dispersing medium within a closed vessel in the presence of a blowing agent; heating the dispersion to soften the unexpanded beads and to impregnate the beads with the blowing agent; and then, while maintaining the pressure within the vessel higher than the vapor pressure of the blowing agent, opening one end of the vessel to discharge the beads and the dispersing medium simultaneously to an atmosphere lower than the pressure within the vessel (generally to atmospheric pressure), thereby expanding the beads.

Other methods may also be adopted such as a method wherein the unexpanded beads are impregnated with a blowing agent in a closed vessel to obtain expandable beads which are then taken out of the vessel and heated so that the expandable beads are softened and expanded; and a method wherein the unexpanded beads which have been kneaded with a decomposition-type blowing agent are heated at a temperature higher than the decomposition temperature of the blowing agent and expanded. With the latter method, however, it becomes difficult to obtain expanded beads having a high closed cell content when the desired apparent density of the expanded particles is low.

In a case where the gel-forming treatment of the unexpanded beads is carried out in a dispersing medium using an organic peroxide as a crosslinking agent, it is preferred that the expansion of the unexpanded beads be performed in the same dispersing medium continuously with the gel-forming treatment, since the process steps may be simplified and productivity may be improved. In such a continuous process, the blowing agent may be added to the dispersing medium before or after the gel-forming treatment. Thus, in one process, after a dispersion containing the unexpanded beads, crosslinking agent and, optionally, crosslinking aid has been reacted, the blowing agent is added to the dispersion and impregnated into the unexpanded beads. The resulting dispersion is then discharged to a lower pressure atmosphere. In an alternate process, the blowing agent is added to a dispersion containing the unexpanded beads together with the crosslinking agent and, optionally, crosslinking aid. The dispersion is then heated to impregnate the unexpanded beads with the blowing agent, crosslinking agent and, optionally, crosslinking aid and is subjected to a gel forming treatment. Then, the dispersion is discharged to a lower pressure atmosphere, after the temperature thereof has been adjusted to a predetermined expansion temperature.

As the blowing agent used for preparing the above expanded beads, there may be used any conventional one such as an organic physical blowing agent, e.g. propane, butane, hexane, cyclopentane, cyclohexane, trifluoromethane, 1,1,1,2-tetrafluoromethane, 1-chloro -1,1-difluoroethane or 1-chloro-1,2,2,2-tetrafluoroethane; or an inorganic physical blowing agent, e.g. nitrogen, carbon dioxide, argon, water or air. Above all, the use of an inorganic physical blowing agent, particularly nitrogen, carbon dioxide or air, is preferred for reasons of cheapness and prevention of the ozone layer. When an aqueous dispersing medium is used, the water can also serve as the blowing agent.

In the above expansion method, the blowing agent is generally used in an amount so that the closed vessel containing the dispersion has a pressure in the range of 5–100 kgf/cm$^2$G. The amount of the blowing agent is suitably selected with the consideration of a relationship between the apparent density of the desired expanded beads and the blowing temperature at which the expansion is carried out. The temperature at which the unexpanded beads are impregnated with the blowing agent is suitably between (Tv−25° C.) and (Tv+30° C.) where Tv is the Vicat softening point of the base resin as defined previously.

The expansion temperature, namely a temperature at which the dispersion is discharged from the closed vessel to a lower pressure atmosphere, is generally in the range of between (Tv−30° C.) and (Tv+30° C.), preferably between (Tv−30° C.) and (Tv+20° C.). When the expansion temperature is in the range of between (Tv−30° C.) and (Tv−10° C.), blocking of the expanded beads and reduction of the closed cell content may be prevented and this range is more preferred.

The expanded beads thus obtained preferably have an apparent density of 0.015–0.09 g/cm$^3$, more preferably 0.022–0.09 g/cm$^3$. When the apparent density is greater than 0.09 g/cm$^3{}_1$ respective expanded beads tend to have various densities and, therefore, various expandability and adhesiveness. Thus, there is a fear of production of a foam molding having unsatisfactory characteristics. When the apparent density is below 0.015 g/cm$^3$, on the other hand, the expansion ratio is so high that sufficient strengths of the cell walls may not be occasionally maintained during molding, resulting in a foam molding having unsatisfactory characteristics.

The "apparent density" as used herein is measured as follows:

In a measuring cylinder containing water at 23° C., at least 500 expanded beads (total weight W1 (g)) which have been allowed to stand at 23° C. under relative humidity of 50% and 1 atm for 2 days are immersed using suitable means such as a wire net to determine the volume V1 (cm$^3$) of the beads from the upper level of the water. The apparent density Ad is calculated as follows:

$$Ad=W1/V1.$$

The expanded beads preferably have a bulk density of 0.014–0.056 g/cm$^3$ The "bulk density" as used herein is measured as follows:

In a measuring cylinder (no water is contained), at least 500 expanded beads (total weight W2 (g)) which have been allowed to stand at 23° C. under relative humidity of 50% and 1 atm for 2 days are placed to determine the volume V2 (cm$^3$) of the beads from the graduation of the cylinder. The bulk density Bd is calculated as follows:

$$Bd=W2/V2.$$

The average weight of one expanded bead may be 1–6 mg, preferably 1–4 mg. As used herein, the "average weight of one expanded bead" is determined by first measuring the total weight of a group of beads (including at least 1000 beads) which have been allowed to stand at 30–40 Torr in an oven at 80° C. for 8 hours, and then counting the total number of the beads of the group. The average is then calculated by dividing the total weight by the total number. The average weight of one expanded bead is the same as the average weight of one precursor, unexpanded bead.

The expanded beads preferably have an average cell wall thickness of 0.2–5 μm, more preferably 0.3–3.5 μm, for reasons of ensuring cell wall strengths suitable for molding of the expanded beads while maintaining suitable foamability of the expanded beads in the molding stage. When the cell wall strengths are considerably weak, cells are apt to rupture so that the resulting foam molding has poor shape recovery by aging. When the foamability of the expanded beads is no good, the resulting foam molding has poor surface smoothness.

As used herein, the term "average cell wall thickness" is intended to refer to a thickness T (cm) defined by the following formula:

$$T=Dm[(1-Vs)^{-1/3}-1]$$

wherein Dm represents an average cell diameter and Vs represents a polymer volume fraction.

The average cell diameter Dm (cm) is measured as follows:

A expanded bead is cut into nearly halves. One of the cut areas is measured for the maximum diameter of each of the cells present in the cut area. An arithmetic mean of the maximum diameters of the all cells is calculated to obtain an average cell diameter ($d_n$) Similar measurement and calculation are repeated for a total of 30 arbitrarily selected expanded beads. The average cell number Dm is an arithmetic mean of the average cell diameters ($d_1$ through $d_{30}$) of the 30 expanded beads.

The polymer volume fraction Vs is given by $$Vs=Ad/ns$$

wherein Ad is the apparent density (g/cm$^3$) of the expanded beads and ns is the density (g/cm$^3$) of the base resin.

The average cell wall thickness of the expanded beads may be controlled by addition of the nucleating agent and by control of the temperature of the atmosphere to which the unexpanded beads have been discharged from a closed vessel and the rate at which the unexpanded beads have been discharged from the closed vessel. When the average cell wall thickness is desired to be reduced, for example, the temperature of the atmosphere is raised and/or the discharging rate is increased.

The expanded beads preferably have an average cell number of 5–2000 per mm$^2$, more preferably 5–1500 per mm$^2$, most preferably 5–1000 per mm$^2$ for reasons of good surface smoothness and dimensional stability of the foam moldings obtained from the expanded beads.

The "average cell number" as used herein is measured as follows:

A expanded bead is cut into nearly halves. One of the cut areas is measured for its area (S1) and a total number (T1)

of cells present in the area. A number (N1) of the cells per unit area (mm$^2$) is then calculated by $$N1=T1/S1.$$

Similar measurement and calculation are repeated for a total of 30 arbitrarily selected expanded beads. The average cell number is an arithmetic mean of the cell numbers of the 30 expanded beads.

The average cell number of the expanded beads may be controlled in the same manner as that for the average cell wall thickness. In particular, by suitably selecting the amount and kind of the nucleating agent, the average cell number may be appropriately controlled to a desired level.

It is important that the expanded beads have a gel fraction of at least 5% by weight in order to attain good moldability, resistance to hydrolysis and heat resistance. The gel fraction of the expanded beads is preferably 10–95% by weight, more preferably 40–90% by weight, most preferably 60–90% by weight.

The "gel fraction" of expanded beads (or unexpanded beads, or a foam molding) as used herein is measured as follows:

A sample (weight: W3 which is about 1 g) of expanded beads (or unexpanded beads, or a foam molding cut into particles having diameters similar to those of the expanded particles) is placed in a 150 ml flask together with 100 ml of chloroform. The mixture is heated at 62° C. and ambient pressure under reflux for 5 hours. While hot (at least 50° C.), the mixture in the flask is decanted to remove the chloroform through a wire net (100 mesh). The solids on the wire net, if collected, are returned to the flask containing swelled residues. Another 100 ml of chloroform is then charged in the flask and the mixture is again heated at 62° C. and ambient pressure under reflux for 5 hours. While hot (at least 50° C.), the mixture in the flask is filtered with a suction filtration device having a 100 mesh wire net. The solids on the wire net is dried in an oven at 80° C. for 8 hours under a reduced pressure of 30–40 Torr. The weight W4 of the dried material thus obtained is measured. The gel fraction is a percentage by weight ((W4/W3)×100%) of the weight W4 based on the sample weight W3.

As described previously, the expanded beads preferably have an apparent density of 0.015–0.09 g/cm$^3$. Expanded beads having an apparent density of not higher than 0.068 g/cm$^3$ may be suitably prepared by a two-stage expansion process in which pre-expanded beads having an apparent density of 0.067–0.134 g/cm$^3$, preferably 0.067–0.1 g/cm$^3$, are first prepared (first expansion step) by the above-described method and the thus prepared pre-expanded beads are then subjected to an expansion treatment (second expansion step) to obtain expanded beads having an apparent density of 0.015–0.068 g/cm$^3$, preferably 0.022–0.068 g/cm$^3$.

In the second expansion treatment, the pre-expanded beads are placed in a closed vessel, to which the above-described inorganic physical blowing agent, such as nitrogen, air or carbon dioxide, or the above-mentioned organic physical blowing agent, such as butane, propane or pentane, is introduced so that the inside pressure in the cells of the pre-expanded beads is increased to preferably 0.2–7 kgf/cm$^2$. The pre-expanded beads whose cells have been charged with the physical blowing agent are then preferably placed in a heat treatment vessel, to which is then fed a heating medium such as steam to further expand the pre-expanded beads. In this case, the expansion ratio may be improved by evacuating the heat treatment vessel, in which the pre-expanded beads have been charged, so as to make the inside thereof under a reduced pressure before the introduction of the heating medium thereinto.

The physical blowing agent used in the second expansion treatment for increasing the pressure inside the cells is preferably an inorganic gas such as air or carbon dioxide for reasons of costs. The heating medium for heating the pre-expanded beads is preferably steam or a mixed gas of steam with compressed air. The heating medium preferably has a temperature between (Vs–30° C.) and (Vs–5° C.), more preferably between (Vs–25° C.) and (Vs–10° C.), where Vc is the Vicat softening point of the base resin. Too high a temperature of the heating medium may cause fusion of cell walls and reduction of the closed cell content of the expanded particles. The use of steam in conjunction with compressed air has an advantage that the temperature of the heating medium may be precisely and easily controlled.

The expanded beads are used for the production of foam moldings. A foam molding may be produced by heating the expanded beads in a mold cavity or between a pair of endless belts so that the expanded beads are fused, inflated and integrated into a unitary body. As heating means for heating the expanded beads, steam is generally used. The heating temperature is such that surfaces of the expanded beads are fused while preventing the breakage of the cell structure thereof. Before heating with the heating medium, an inorganic gas such as air may be suitably introduced into the mold cavity filled with the expanded beads so as to increase the inside pressure in the cells of the expanded beads in the same manner as in the above-described two-stage expansion process. By this expedient, the foamability of the expanded beads and the shape recovery properties of the foam molding after completion of the molding may be improved. The inside pressure is preferably 0.2–2.5 kgf/cm$^2$.

The "inside pressure in the cells of the expanded beads" Pi (kgf/cm$^2$) as used herein is defined as follows:

$$Pi=(Wi \times R \times Te \times Y)/(M \times L)$$

wherein
Wi is an amount of gas increased (g),
R is the gas constant and is 0.082 (atm·L/(K·mol),
Te is an ambient temperature and is 296K,
Y is a coefficient for converting the unit atm to kgf/cm$^2$ and is 1.0332 (kgf/(cm$^2$·atm)),
M is the molecular weight of the gas used for increasing the inside pressure in the cells of the expanded beads and is 28.9 (g/mol) in the case of air, and
L is the volume (liter) of the gas in the expanded beads.

The amount of gas increased Wi (g) is measured as follows.

A quantity (at least 500 beads) of expanded beads whose cells have been just pressurized with a gas in a vessel are taken out of the vessel and placed, within 60 seconds after the take-out, on a weighing device provided in a thermostatic chamber maintained at 23° C. and 50% relative humidity under ambient pressure. The weight (Q g) of the beads is measured just 120 seconds after the expanded beads have been taken out from the vessel. The expanded beads are then allowed to stand for 240 hours in the chamber at 23° C. and 50% relative humidity under ambient pressure. The gas in the cells of the expanded beads gradually permeates through the cell walls and escapes from the beads. Therefore, the weight of the beads decreases with the lapse of time. However, an equilibrium has been established and the weight decrease no longer occurs after lapse of the 240 hours period. Thus, the weight of the expanded beads (S g) is measured in the same chamber after the lapse of the 240 hours period. The measurement of the weight should be carried out precisely to the fourth decimal place (0.0001 g). The balance represents the amount of gas increased (Wi=Q−S).

The volume of the gas in the expanded beads L is defined as follows.

$$L(\text{liter})=(S/ns)\times\{(ns/Ad)-1\}\times 10^{-3}$$

wherein

S is the weight (g) of the expanded beads measured above, ns is the density (g/cm$^3$) of the base resin, and
Ad is the apparent density (g/cm$^3$) of the expanded beads.

The foam molding prepared from the expanded beads has any desired shape such as receptable, plate, cylinder or block. The foam molding which preferably has a density of 0.012–0.06 g/cm$^3$ has good dimensional stability and surface smoothness. The "density" of the foam molding as used herein is intended to refer to a value obtained by dividing the weight WM (g) of the molding by the volume VM (cm$^3$) of the molding which has been maintained at 23° C. and 50% relative humidity under 1 atm for 2 days (density=WM/VM).

The following examples will further illustrate the present invention. "Parts" are by weight.

EXAMPLES 1 TO 8, COMPARATIVE EXAMPLES 1 AND 2

An aliphatic polyester resin (BIONORE #1001 manufactured by Showa High Polymer Co., Ltd.; melting point: 112° C.; Vicat softening point: 109° C., MFR (190° C., load: 21.18N): 1.5 g/10 min; density: 1.26 g/cm$^3$) composed mainly of 1,4-butanediol and succinic acid, a metal salt of a fatty acid as shown in Table 1 and a phthalocyanin green pigment as a colorant were melted and kneaded in a single axis extruder and then extruded into strands. In Comparative Example 1, talc was used in an amount of 0.5% by weight in lieu of a gel accelerating agent. The strands were cut to obtain resin beads each having a diameter of about 1.5 mm, a length of about 1.6 mm and an average weight of 3 mg. The additives such as the metal salt of a fatty acid were added to the polyester resin in the form of a master batch so as to be uniformly dispersed therein in amounts as shown in Table 1. The phthalocyanin green pigment was added to the polyester resin in the form of a master batch in such an amount that the content thereof in the polyester resin was 20 ppm.

100 Parts of the resin beads, 300 parts of water, 0.5 parts of aluminum oxide, 0.004 part of sodium dodecylbenzenesulfonate, 1.5 parts of Nyper FF (dicyclohexyl phthalate-diluted benzoylperoxide manufactured by Nippon Yushi Co., Ltd.; purity 50%) and methyl methacrylate (MMA) (manufactured by Kanto Kagaku Co., Ltd.) in an amount shown in Table 1 were charged into a 5 liter-autoclave, and nitrogen gas was then introduced into the autoclave for 5 minutes to remove oxygen therefrom. The mixture was heated with stirring to 75° C., maintained at that temperature for 20 minutes and heated to 105° C. Carbon dioxide was then fed to the autoclave until the inside pressure thereof reached to 45 kgf/cm$^2$G and the mixture was maintained at that temperature for 45 minutes with stirring. The mixture was then cooled to a temperature shown in Table 2 and held at that temperature for 5 minutes with stirring. Then, at that holding temperature, one end of the autoclave was opened, and, while introducing a nitrogen gas into the autoclave to maintain the inside pressure thereof, the contents therein were discharge to ambient pressure to allow the gelled resin to expand (1st expansion stage), thereby obtaining pre-expanded beads. The gel fraction, apparent density, closed cell content, average cell diameter, average cell number and average cell wall thickness of the thus obtained pre-expanded beads are summarized in Table 3.

The thus obtained pre-expanded beads were filled in an airtight vessel and then pressurized with air to increase the inside pressure in the cells thereof to a value as shown in Table 4. The pre-expanded beads were then filled in another vessel connected to a steam supply device for supplying heating steam. After reducing the pressure in the vessel to a value shown in Table 4, the pre-expanded beads were heated with a heating medium (a mixture of steam and compressed air) having a temperature shown in Table 4 (2nd expansion stage), thereby obtaining foamed expanded beads. The apparent density, average cell diameter, average cell number and average cell wall thickness of the foamed expanded beads are summarized in Tables 4 and 5. The hydrolysis resistance of the foamed expanded beads was also evaluated to give the results summarized in Table 6.

The thus obtained foamed expanded beads were filled in an airtight vessel and then pressurized with air to apply an inside pressure of 0.6 kg/cm in the cells thereof. Then, the foamed expanded beads were filled in a mold cavity having a size of 250×300×60 mm and molded therein by heating with a steam having a temperature shown in Table 6. The thus obtained molding was aged at 40° C. for 24 hours under ambient pressure. The density, hydrolysis resistance and shrinkage of the foam moldings were evaluated to give the results summarized in Table 6.

EXAMPLES 9–11

Example 1 was repeated in the same manner as described except that 0.75 part of Nyper BW (water-diluted benzoylperoxide manufactured by Nippon Yushi Co., Ltd.; purity: 75%) was substituted for 1.5 parts of Nyper FF and that the preparation conditions were changed as shown in Tables 1, 2 and 4, thereby obtaining foam moldings. The properties of the pre-expanded beads, foamed expanded beads and foam moldings are shown in Tables 3–6.

In Examples 4, 5 and 11, an amine surfactant (Trade name: Armostat 515; mixture of N,N-bis(2-hydroxyethyl) alkylamine with a higher fatty alcohol; manufactured by Lion Corporation) was used in conjunction with magnesium stearate as a gel accelerating agent.

TABLE 1

|  | Polyester resin | Gel accelerating agent | | Bead weight (mg) | Peroxide (parts) | Cross-linking aid (parts) |
| --- | --- | --- | --- | --- | --- | --- |
|  |  | Kind | Amount (wt %) |  |  |  |
| Ex. 1 | BIONORE #1001 | Mg stearate | 0.5 | 3 | 1.5 | MMA 0.3 |
| Ex. 2 | BIONORE #1001 | Al stearate | 0.5 | 3 | 1.5 | MMA 0.3 |
| Ex. 3 | BIONORE #1001 | Ca stearate | 0.5 | 3 | 1.5 | MMA 0.3 |

TABLE 1-continued

| | Polyester resin | Gel accelerating agent Kind | Gel accelerating agent Amount (wt %) | Bead weight (mg) | Peroxide (parts) | Crosslinking aid (parts) |
|---|---|---|---|---|---|---|
| Ex. 4 | BIONORE #1001 | Mg stearate + amine surfactant | 0.5 + 0.5 | 3 | 1.5 | MMA 0.1 |
| Ex. 5 | BIONORE #1001 | Mg stearate + amine surfactant | 0.5 + 0.9 | 3 | 1.5 | Nil |
| Ex. 6 | BIONORE #1001 | Mg stearate | 0.8 | 3 | 1.5 | MMA 0.5 |
| Ex. 7 | BIONORE #1001 | Stearamide | 0.5 | 3 | 1.5 | MMA 0.2 |
| Ex. 8 | BIONORE #1001 | Mg stearate | 0.5 | 3 | 1.5 | MMA 0.6 |
| Comp. Ex. 1 | BIONORE #1001 | Talc | 0.5 | 3 | 1.5 | MMA 0.3 |
| Comp. Ex. 2 | BIONORE #1001 | Ca stearate | 4 | 3 | 1.5 | MMA 0.3 |
| Ex. 9 | BIONORE #1001 | Mg stearate | 0.5 | 3 | 0.75 | MMA 0.1 |
| Ex. 10 | BIONORE #1001 | Mg stearate | 0.5 | 3 | 0.75 | MMA 0.1 |
| Ex. 11 | BIONORE #1001 | Mg stearate + amine surfactant | 0.5 + 0.5 | 3 | 0.75 | MMA 0.1 |

TABLE 2

| | Impregnating conditions for peroxide and crosslinking aid (° C. × min) | Gel-forming and blowing agent impregnation conditions (° C. × min) | Holding temperature (° C.) | Carbon dioxide (kgf/cm$^2$G) |
|---|---|---|---|---|
| Ex. 1 | 75 × 20 | 105 × 45 | 95 | 45 |
| Ex. 2 | 75 × 20 | 105 × 45 | 95 | 45 |
| Ex. 3 | 75 × 20 | 105 × 45 | 95 | 45 |
| Ex. 4 | 75 × 20 | 105 × 45 | 95 | 45 |
| Ex. 5 | 75 × 20 | 105 × 45 | 95 | 45 |
| Ex. 6 | 75 × 20 | 105 × 45 | 95 | 45 |
| Ex. 7 | 75 × 20 | 105 × 45 | 95 | 45 |
| Ex. 8 | 75 × 20 | 105 × 45 | 95 | 45 |
| Comp. Ex. 1 | 75 × 20 | 105 × 45 | 95 | 45 |
| Comp. Ex. 2 | 75 × 20 | 105 × 45 | 95 | 45 |
| Ex. 9 | 75 × 20 | 105 × 45 | 95 | 45 |
| Ex. 10 | —* | 105 × 45 | 95 | 45 |
| Ex. 11 | 75 × 20 | 105 × 45 | 95 | 45 |

*Holding time for impregantion is zero.

TABLE 3

| | Pre-Expanded Beads | | | | | |
|---|---|---|---|---|---|---|
| | Gel fraction (%) | Apparent density (g/cm$^3$) | Closed cell content (%) | Average cell diameter (μm) | Average cell number (/mm$^2$) | Average cell thickness (μm) |
| Ex. 1 | 75 | 0.085 | 94 | 160 | 138 | 3.77 |
| Ex. 2 | 63 | 0.073 | 88 | 50 | 420 | 1.00 |
| Ex. 3 | 71 | 0.081 | 87 | 40 | 825 | 0.90 |
| Ex. 4 | 68 | 0.093 | 92 | 50 | 658 | 1.29 |
| Ex. 5 | 60 | 0.072 | 90 | 80 | 274 | 1.58 |
| Ex. 6 | 80 | 0.092 | 93 | 60 | 471 | 1.54 |
| Ex. 7 | 74 | 0.088 | 89 | 150 | 125 | 3.66 |
| Ex. 8 | 92 | 0.134 | 95 | 30 | 1210 | 1.15 |
| Comp. Ex. 1 | 72 | 0.096 | 84 | 130 | 241 | 3.43 |
| Comp. Ex. 2 | 67 | 0.067 | 68 | 30 | 1250 | 0.55 |
| Ex. 9 | 76 | 0.097 | 94 | 120 | 179 | 3.25 |
| Ex. 10 | 78 | 0.099 | 95 | 110 | 198 | 3.04 |
| Ex. 11 | 79 | 0.090 | 91 | 60 | 517 | 1.50 |

TABLE 4

| | Inside pressure (kgf/cm$^2$) | Pressure in vessel (kgf/cm$^2$G) | Heating medium temperature (° C.) | Apparent density of foamed expanded beads (g/cm$^3$) |
|---|---|---|---|---|
| Ex. 1 | 4.5 | −0.25 | 97 | 0.029 |
| Ex. 2 | 4.1 | −0.25 | 95 | 0.027 |
| Ex. 3 | 4.3 | −0.25 | 99 | 0.027 |
| Ex. 4 | 4.9 | −0.25 | 98 | 0.029 |
| Ex. 5 | 4.4 | −0.25 | 96 | 0.028 |
| Ex. 6 | 4.6 | −0.25 | 97 | 0.026 |
| Ex. 7 | 4.3 | −0.25 | 98 | 0.029 |
| Ex. 8 | 4.6 | −0.25 | 94 | 0.045 |
| Comp. Ex. 1 | 4.5 | −0.25 | 99 | 0.029 |
| Comp. Ex. 2 | 1.9 | −0.25 | 98 | 0.037 |
| Ex. 9 | 4.9 | −0.25 | 98 | 0.029 |
| Ex. 10 | 4.8 | −0.25 | 99 | 0.029 |
| Ex. 11 | 4.6 | −0.25 | 95 | 0.028 |

TABLE 5

| | Average cell diameter of foamed expanded beads (μm) | Average cell number of foamed expanded beads (/mm$^2$) | Average cell wall thickness of foamed expanded beads (μm) |
|---|---|---|---|
| Ex. 1 | 210 | 47 | 1.63 |
| Ex. 2 | 120 | 124 | 0.88 |
| Ex. 3 | 90 | 206 | 0.65 |
| Ex. 4 | 140 | 103 | 1.09 |
| Ex. 5 | 190 | 65 | 1.43 |
| Ex. 6 | 200 | 52 | 1.39 |
| Ex. 7 | 230 | 42 | 1.79 |
| Ex. 8 | 90 | 211 | 1.10 |
| Comp. Ex. 1 | 240 | 38 | 1.87 |
| Comp. Ex. 2 | 50 | 396 | 0.50 |

TABLE 5-continued

|  | Average cell diameter of foamed expanded beads ($\mu$m) | Average cell number of foamed expanded beads (/mm$^2$) | Average cell wall thickness of foamed expanded beads ($\mu$m) |
|---|---|---|---|
| Ex. 9 | 220 | 40 | 1.71 |
| Ex. 10 | 210 | 44 | 1.64 |
| Ex. 11 | 160 | 73 | 1.20 |

TABLE 6

|  | Molding temperature (° C.) | Hydrolysis resistance of foamed expanded beads | Hydrolysis resistance of foam molding | Density of foam molding (g/cm$^3$) | Shrinkage of foam molding (%) |
|---|---|---|---|---|---|
| Ex. 1 | 128 | A | A | 0.021 | 3.7 |
| Ex. 2 | 128 | B | A | 0.021 | 3.8 |
| Ex. 3 | 128 | B | A | 0.021 | 4.5 |
| Ex. 4 | 128 | A | A | 0.022 | 4.0 |
| Ex. 5 | 128 | A | A | 0.021 | 4.0 |
| Ex. 6 | 128 | A | A | 0.019 | 3.8 |
| Ex. 7 | 128 | B | A | 0.022 | 4.2 |
| Ex. 8 | 128 | A | A | 0.031 | 4.7 |
| Comp. Ex. 1 | 128 | C | B | 0.021 | 6.2 |
| Comp. Ex. 2 | 128 | C | B | 0.039 | 11.0 |
| Ex. 9 | 128 | A | A | 0.021 | 3.8 |
| Ex. 10 | 128 | A | A | 0.022 | 4.0 |
| Ex. 11 | 128 | A | A | 0.021 | 4.0 |

EXAMPLES 12–17

An aliphatic polyester resin (BIONORE #1001 manufactured by Showa High Polymer Co., Ltd.; melting point: 112° C.; Vicat softening point: 109° C., MFR (190° C., load: 21.18N): 1.5 g/10 min; density: 1.26 g/cm$^3$) composed mainly of 1,4-butanediol and succinic acid, a metal salt of a fatty acid shown in Table 7, talc (Hifiller #12 manufactured by Matsumura Sangyo Co., Ltd.; average particle diameter: 2.5 $\mu$m) as inorganic particles and a phthalocyanin green pigment as a colorant were melted and kneaded in a two-axis extruder and then extruded into strands while evacuating to remove vapors. The strands were cut to obtain resin beads each having a diameter of about 1.0 mm, a length of about 3.0 mm and an average weight of 3 mg. The metal salt of a fatty acid was added to the polyester resin in the form of a master batch so as to be uniformly dispersed therein in an amount as shown in Table 7. The phthalocyanin green pigment was added to the polyester resin in the form of a master batch so as to be uniformly dispersed therein in such an amount that the content thereof in the polyester resin was 20 ppm. The talc was added to the polyester resin in the form of a master batch so as to be uniformly dispersed therein in an amount as shown in Table 7.

100 Parts of the resin beads, 300 parts of water, 0.5 parts of aluminum oxide, 0.004 part of sodium dodecylbenzenesulfonate, 1.5 parts of Nyper FF (benzoylperoxide manufactured by Nippon Yushi Co., Ltd.; purity 50%) and methyl methacrylate (MMA) (manufactured by Kanto Kagaku Co., Ltd.) in an amount shown in Table 7 were charged into a 5 liter-autoclave and nitrogen gas was then introduced into the autoclave for 5 minutes to remove oxygen therefrom. The mixture was heated with stirring to 75° C., maintained at that temperature for 20 minutes and heated to 105° C. Carbon dioxide was then fed to the autoclave until the inside pressure thereof reached to 40 kgf/cm$^2$G and the mixture was maintained at that temperature for 45 minutes with stirring. The mixture was then cooled to a temperature shown in Table 8 and held at that temperature for 5 minutes with stirring. Then, at that holding temperature, one end of the autoclave was opened, and, while introducing a nitrogen gas into the autoclave to maintain the inside pressure thereof, the contents therein were discharge to ambient pressure to allow the gelled resin to expand (1st expansion stage), thereby obtaining pre-expanded beads. The gel fraction, apparent density, average cell diameter, average cell number and average cell wall thickness of the thus obtained pre-expanded beads are summarized in Table 9.

The thus obtained pre-expanded beads were filled in an airtight vessel and then pressurized with air to increase the inside pressure in the cells thereof to a value as shown in Table 10. The pre-expanded beads were then filled in another vessel connected to a steam supply device for supplying heating steam. After reducing the pressure in the vessel to a value shown in Table 10, the pre-expanded beads were heated with a heating medium (a mixture of steam and compressed air) having a temperature shown in Table 10 (2nd expansion stage), thereby obtaining foamed expanded beads. The apparent density, average cell diameter, average cell number and average cell wall thickness of the foamed expanded beads are summarized in Tables 10 and 11. The hydrolysis resistance of the foamed expanded beads was also evaluated to give the results summarized in Table 12.

The thus obtained foamed expanded beads were filled in an airtight vessel and then pressurized with air to apply an inside pressure as shown in Table 12 in the cells thereof. Then, the foamed expanded beads were filled in a mold cavity having a size of 200×250×50 mm and molded therein by heating with a steam having a temperature shown in Table 12. The thus obtained molding was aged at 40° C. for 24 hours under ambient pressure. The density, hydrolysis resistance and shrinkage of the foam moldings were evaluated to give the results summarized in Table 12.

COMPARATIVE EXAMPLE 3

Example 12 was repeated in the same manner as described except that magnesium stearate was not used at all. The properties of the pre-expanded beads, foamed expanded beads and foam molding thus obtained are shown in Tables 9–12.

EXAMPLE 18

Example 12 was repeated in the same manner as described except that talc was not used at all. The properties of the pre-expanded beads, foamed expanded beads and foam molding thus obtained are shown in Tables 9–12.

The gel fractions of the pre-expanded beads, the foamed expanded beads after the 2nd expansion stage and the foam moldings of the foregoing Examples and Comparative Examples were almost the same.

TABLE 7

| | Polyester resin | Gel accelerating agent Kind | Gel accelerating agent Amount (wt %) | Amount of talc (wt %) | Peroxide (parts) | Crosslinking aid (parts) |
|---|---|---|---|---|---|---|
| Ex. 12 | BIONORE #1001 | Mg stearate | 0.5 | 0.1 | 1.5 | MMA 0.2 |
| Ex. 13 | BIONORE #1001 | Mg stearate | 0.5 | 0.1 | 1.5 | MMA 0.15 |
| Ex. 14 | BIONORE #1001 | Mg stearate | 0.5 | 0.1 | 1.5 | MMA 0.25 |
| Ex. 15 | BIONORE #1001 | Mg stearate | 1.0 | 0.1 | 1.5 | MMA 0.2 |
| Ex. 16 | BIONORE #1001 | Mg stearate | 0.2 | 0.1 | 1.5 | MMA 0.15 |
| Ex. 17 | BIONORE #1001 | Mg stearate | 0.9 | 0.05 | 1.5 | MMA 0.15 |
| Comp. Ex. 3 | BIONORE #1001 | — | — | 0.1 | 1.5 | MMA 0.2 |
| Ex. 18 | BIONORE #1001 | Mg stearate | 0.5 | — | 1.5 | MMA 0.2 |

TABLE 8

| | Impregnating conditions for peroxide and crosslinking aid (° C. × min) | Blowing agent impregnation conditions (° C. × min) | Holding conditions (° C. × min) | Carbon dioxide (kgf/cm²G) |
|---|---|---|---|---|
| Ex. 12 | 75 × 20 | 105 × 45 | 95 × 5 | 40 |
| Ex. 13 | 75 × 20 | 105 × 45 | 95 × 5 | 40 |
| Ex. 14 | 75 × 20 | 105 × 45 | 95 × 5 | 40 |
| Ex. 15 | 75 × 20 | 105 × 45 | 95 × 5 | 40 |
| Ex. 16 | 75 × 20 | 105 × 45 | 95 × 5 | 40 |
| Ex. 17 | 75 × 20 | 105 × 45 | 95 × 5 | 40 |
| Comp. Ex. 3 | 75 × 20 | 105 × 45 | 95 × 5 | 40 |
| Ex. 18 | 75 × 20 | 105 × 45 | 95 × 5 | 40 |

TABLE 9

| | Pre-Expanded Beads | | | | |
|---|---|---|---|---|---|
| | Gel fraction (%) | Apparent density (g/cm³) | Average cell diameter (μm) | Average cell number (/mm²) | Average cell thickness (μm) |
| Ex. 12 | 79 | 0.090 | 50 | 624 | 1.25 |
| Ex. 13 | 72 | 0.076 | 70 | 335 | 1.47 |
| Ex. 14 | 82 | 0.099 | 40 | 764 | 1.11 |
| Ex. 15 | 72 | 0.067 | 60 | 288 | 1.10 |
| Ex. 16 | 74 | 0.086 | 70 | 413 | 1.67 |
| Ex. 17 | 73 | 0.074 | 110 | 252 | 2.24 |
| Comp. Ex. 3 | 69 | 0.085 | 40 | 736 | 0.94 |
| Ex. 18 | 74 | 0.103 | 210 | 84 | 6.06 |

TABLE 10

| | Inside pressure (kgf/cm²) | Pressure in vessel (kgf/cm²G) | Heating medium temperature (° C.) | Apparent density of foamed expanded beads (g/cm³) |
|---|---|---|---|---|
| Ex. 12 | 5.0 | −0.25 | 97 | 0.034 |
| Ex. 13 | 4.2 | −0.25 | 95 | 0.027 |
| Ex. 14 | 4.7 | −0.25 | 97 | 0.043 |
| Ex. 15 | 3.2 | −0.25 | 97 | 0.029 |
| Ex. 16 | 4.4 | −0.25 | 96 | 0.034 |
| Ex. 17 | 3.7 | −0.25 | 96 | 0.033 |
| Comp. Ex. 3 | 4.3 | −0.25 | 98 | 0.035 |
| Ex. 18 | 4.0 | −0.25 | 99 | 0.037 |

TABLE 11

| | Average cell diameter of foamed expanded beads (μm) | Average cell number of foamed expanded beads (/mm²) | Average cell wall thickness of foamed expanded beads (μm) |
|---|---|---|---|
| Ex. 12 | 110 | 121 | 1.01 |
| Ex. 13 | 150 | 82 | 1.09 |
| Ex. 14 | 80 | 184 | 0.93 |
| Ex. 15 | 130 | 105 | 1.01 |
| Ex. 16 | 140 | 98 | 1.28 |
| Ex. 17 | 170 | 64 | 1.51 |
| Comp. Ex. 3 | 100 | 205 | 0.89 |
| Ex. 18 | 380 | 16 | 3.69 |

TABLE 12

| | Molding temperature (° C.) | Inside Pressure (kgf/cm²) | Hydrolysis resistance of foamed expanded beads | Hydrolysis resistance of foam molding | Density of foam molding (g/cm³) | Shrinkage of foam molding (%) |
|---|---|---|---|---|---|---|
| Ex. 12 | 134 | 0.6 | A | A | 0.024 | 4.0 |
| Ex. 13 | 128 | 0.6 | A | A | 0.020 | 4.4 |
| Ex. 14 | 138 | 0.5 | A | A | 0.031 | 3.8 |
| Ex. 15 | 128 | 0.6 | A | A | 0.021 | 4.0 |
| Ex. 16 | 128 | 0.6 | A | A | 0.024 | 4.0 |
| Ex. 17 | 128 | 0.6 | A | A | 0.024 | 4.4 |
| Comp. Ex. 3 | 128 | 0.6 | C | B | 0.033 | 4.8 |
| Ex. 18 | 128 | 0.6 | A | A | 0.036 | 4.8 |

The shrinkage and hydrolysis resistance of foam moldings, and the hydrolysis resistance of foamed expanded beads were measured according to the methods shown below.

Shrinkage

Foamed and expanded beads obtained were maintained at 23° C. and a relative humidity of 50% for 72 hours and molded as described above. The shrinkage of the foam molding in the direction normal to the thickness direction of the molding (between two shrinkage values in the longitudinal and lateral directions, a greater value was used) was calculated as follows:

$$R=[(B-A)/B]\times 100\ (\%) \tag{5}$$

wherein

R: Shrinkage of the molding

A: Length (longitudinal or lateral length) of the molding aged under conditions of a temperature of 40° C. for 24 hours immediately after the molding step B: Length of the mold cavity corresponding to A Hydrolysis Resistance of Foamed and Expanded Beads:

In the above Examples and Comparative Examples, the hydrolysis resistance of the foamed beads was evaluated according to the following ratings:

A: When the foamed beads were allowed to stand under conditions of a temperature of 40° C. and a relative humidity of 80% for 30 days and molded in a mold, the shrinkage of the molding obtained according to the equation (5) is less than 7%.

B: When the foamed beads were allowed to stand under conditions of a temperature of 40° C. and a relative humidity of 80% for 20 days and molded in a mold, the shrinkage of the molding obtained according to the equation (5) is less than 7%, and when the foamed beads were allowed to stand under conditions of a temperature of 40° C. and a relative humidity of 80% for 30 days and molded in a mold, the shrinkage of the molding obtained according to the equation (5) is more than 7%.

C: When the foamed beads were allowed to stand under conditions of a temperature of 40° C. and a relative humidity of 80% for 20 days and molded in a mold, the shrinkage of the molding obtained according to the equation (5) is more than 7%.

Hydrolysis Resistance of Foam Molding:

In the above Examples and Comparative Examples, the hydrolysis resistance of the molding was evaluated as follows:

After being allowed to stand under conditions of a temperature of 40° C. and a relative humidity of 80% for 60 days, the molding was measured for the 25% compression hardness provided in JIS K-6767-1976. The evaluation was made according to the following ratings:

A: The 25% compression hardness is 0.4 kgf/cm$^2$ or higher.

B: The 25% compression hardness is lower than 0.4 kgf/cm$^2$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2002-102573, filed Apr. 4, 2002, inclusive of the specification and claims, are hereby incorporated by reference herein.

What is claimed is:

1. Foamed and expanded beads comprising:
   a base resin including a polyester-based resin containing at least 35 mole % of an aliphatic ester component, and
   at least one gel accelerating agent selected from the group consisting of fatty acids having 12–25 carbon atoms, metal salts of the fatty acids, esters of the fatty acids and amides of the fatty acids, said at least one gel accelerating agent being uniformly dispersed in said base resin in an amount of 0.15–3% by weight, said beads having a gel fraction of at least 5% by weight.

2. Foamed and expanded beads as claimed in claim 1, and having an apparent density of 0.015–0.09 g/cm$^3$.

3. Foamed and expanded beads as claimed in claim 1, and having a gel fraction of 40–90% by weight.

4. Foamed and expanded beads as claimed in claim 1, further comprising inorganic particles in an amount of 0.001–5% by weight.

5. Foamed and expanded beads as claimed in claim 4, wherein said inorganic particles comprise silicates.

6. Foamed and expanded beads as claimed in claim 4, wherein said inorganic particles are talc.

7. Foamed and expanded beads as claimed in claim 4, and having a apparent density of 0.015–0.09 g/cm$^3$.

8. Foamed and expanded beads as claimed in claim 4, and having a gel fraction of 40–90% by weight.

9. Foamed and expanded beads as claimed in claim 1, wherein said base resin further comprises an additional polymer other than polyester-based resin in an amount of 40% by weight or less.

10. Foamed and expanded beads as claimed in claim 1, wherein said base resin consists essentially of the polyester-based resin.

11. A foam molding obtained by heating the foamed and expanded beads according to claim 1 in a mold.

12. A foam molding obtained by heating the foamed and expanded beads according to claim 4 in a mold.

13. Foamed and expanded beads as claimed in claim 1 wherein said base resin has said gel accelerating agent uniformly dispersed therein by kneading together of the base resin and gel accelerating agent.

* * * * *

UNITED STATES PATENT AND TRADEMARK OFFICE
CERTIFICATE OF CORRECTION

PATENT NO. : 6,686,400 B2
DATED : February 3, 2004
INVENTOR(S) : Tokiwa et al.

It is certified that error appears in the above-identified patent and that said Letters Patent is hereby corrected as shown below:

Column 22,
Line 27, "glcm" should be -- $g/cm^3$ --

Signed and Sealed this

Seventh Day of September, 2004

JON W. DUDAS
*Acting Director of the United States Patent and Trademark Office*